(12) United States Patent
Rosen

(10) Patent No.: US 6,786,421 B2
(45) Date of Patent: Sep. 7, 2004

(54) PROGRAMMABLE THERMOSTAT INCLUDING A FEATURE FOR PROVIDING A RUNNING TOTAL FOR THE COST OF ENERGY CONSUMED DURING A GIVEN PERIOD FOR HEATING AND/OR COOLING A CONDITIONED SPACE

(76) Inventor: Howard Rosen, Lyncroft Road, Hampstead, Quebec, H3X 3E3 (CA)

( * ) Notice: Subject to any disclaimer, the term of this patent is extended or adjusted under 35 U.S.C. 154(b) by 0 days.

(21) Appl. No.: 10/654,236

(22) Filed: Sep. 3, 2003

(65) Prior Publication Data

US 2004/0074978 A1 Apr. 22, 2004

Related U.S. Application Data

(63) Continuation-in-part of application No. 10/060,768, filed on Jan. 30, 2002.

(51) Int. Cl.[7] .................................................. F23N 1/00
(52) U.S. Cl. .......................... 236/94; 62/129; 165/11.1; 705/412; 702/61
(58) Field of Search ........................ 236/94; 62/127, 62/129; 340/584, 870.02, 310.01; 165/11.1; 705/400, 412; 702/61, 62

(56) References Cited

U.S. PATENT DOCUMENTS

| | | | |
|---|---|---|---|
| 4,224,625 A | | 9/1980 | Peretz |
| 5,170,935 A | | 12/1992 | Federspiel et al. |
| 5,696,695 A | * | 12/1997 | Ehlers et al. ............... 700/286 |
| 5,818,428 A | | 10/1998 | Eisenbrandt et al. |
| 6,167,388 A | * | 12/2000 | Ray ........................... 705/400 |
| 6,216,956 B1 | * | 4/2001 | Ehlers et al. .................. 236/47 |
| 6,285,912 B1 | | 9/2001 | Ellison et al. |
| 6,478,233 B1 | * | 11/2002 | Shah ........................ 236/46 R |
| 6,734,806 B1 | * | 5/2004 | Cratsley, III ........... 340/870.09 |
| 2002/0152298 A1 | * | 10/2002 | Kikta et al. .................. 709/223 |
| 2003/0050737 A1 | * | 3/2003 | Osann, Jr. .................... 700/276 |
| 2003/0193405 A1 | * | 10/2003 | Hunt et al. ............ 340/870.02 |
| 2004/0034484 A1 | * | 2/2004 | Solomita et al. .............. 702/62 |

* cited by examiner

Primary Examiner—Marc Norman
(74) Attorney, Agent, or Firm—David T. Bracken

(57) ABSTRACT

A programmable thermostat having a touch screen liquid crystal display in which the power consumption of each heating/cooling component and the energy costs in the locality are entered by a user in order that the thermostat's control program can, upon demand, calculate and display the heating/cooling costs accrued beginning with a user-specified starting date.

13 Claims, 8 Drawing Sheets

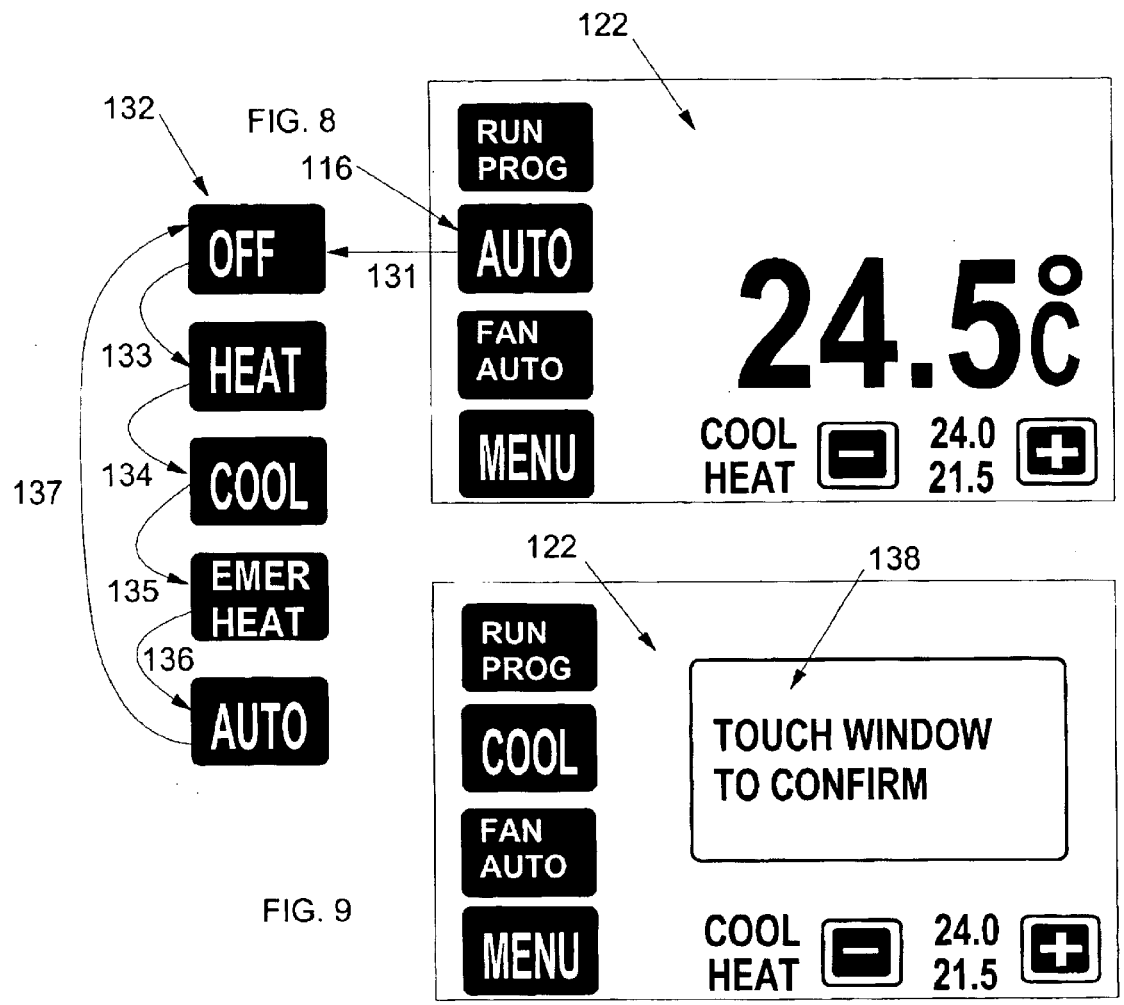
FIG. 8
FIG. 9
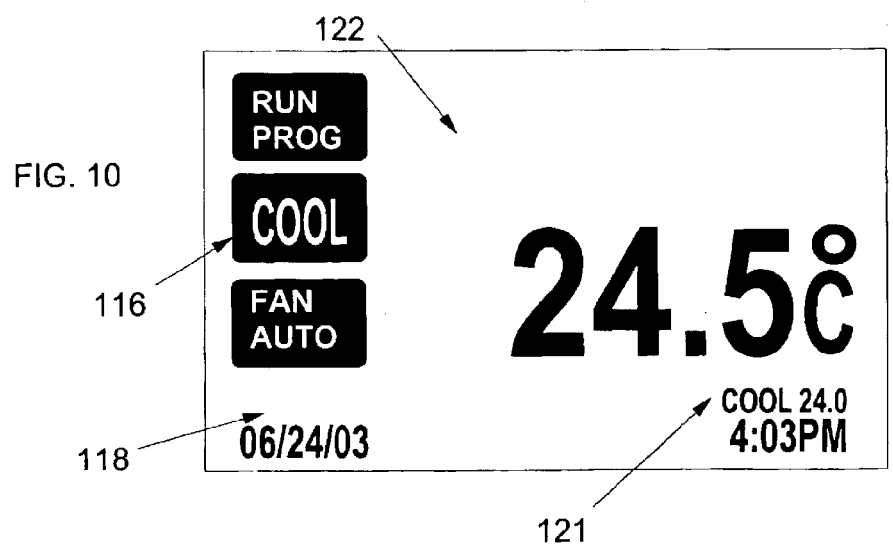
FIG. 10

PROGRAMMABLE THERMOSTAT INCLUDING A FEATURE FOR PROVIDING A RUNNING TOTAL FOR THE COST OF ENERGY CONSUMED DURING A GIVEN PERIOD FOR HEATING AND/OR COOLING A CONDITIONED SPACE

CROSS-REFERENCE TO RELATED APPLICATIONS

This application is a continuation in part of pending U.S. patent application Ser. No. 10/060,768 filed Jan. 30, 2002. This application is related to: U.S. application Ser. No. 10/654,235 entitled "Programmable Thermostat Incorporating a Liquid Crystal Display Selectively Presenting Adaptable System Menus Including Changeable Interactive Virtual Buttons" by Howard B. Rosen, filed on even date herewith; and co-pending U.S. application Ser. No. 10/654,230 entitled "Programmable Thermostat Incorporating a Liquid Crystal Display and Having a Feature for Mounting Horizontally, Vertically and Any Intermediate Orientation" by Howard B. Rosen, filed on even date herewith.

FIELD OF THE INVENTION

The present invention relates to a programmable thermostat incorporating an interactive liquid crystal display (LCD), and, more particularly, to such a thermostat which includes a feature for providing a running total for the cost of energy consumed during a given period for heating and/or cooling a conditioned space.

BACKGROUND OF THE INVENTION

Thermostats have been used for many years as temperature sensitive switches which control heating and/or cooling equipment for conditioning a space in which the thermostat, or a temperature sensor connected to the thermostat, is placed. In the well known manner, a simple thermostat can be adjusted to establish a temperature set point such that, when the temperature in the conditioned space reaches the set point, the thermostat interacts with the heating and/or/cooling equipment to take suitable action to heat or cool the conditioned space as may be appropriate for the season as established by a user.

Modern thermostat systems, which take advantage of the ongoing rapid advances in electronic technology and circuit integration, have many features which provide more precise supervision of the heating and/or cooling equipment to achieve more economical and more comfortable management of the temperature of a conditioned space. Many modern thermostat systems include a real time clock, a memory and a data processor to run a process control program stored in the memory; Such thermostats accurately measure the temperature of a temperature sensor disposed in the conditioned space and make decisions to send control signals to the heating and/or cooling equipment in order to closely control the temperature of the conditioned space. The use of programmed thermostat systems permits anticipating and minimizing hysterisis or overshoot of the temperature in the conditioned space. In addition, the program can specify different set points at different times of the day and week and may also include a "vacation" mode which employs different set points when the conditioned space is not occupied for an extended period.

Many modern thermostat systems are programmable by a user. Typically, prior art programmable thermostat systems employ a set of fixed position, button-actuated switches to be depressed in a precise sequence to program set points (which may vary with the day of the week) for programmable time periods which may include a vacation mode. The programming sequence may be followed on a separate display, typically an LCD with segmented text characters. In some modern thermostats, "virtual" buttons are presented on the LCD itself which is juxtaposed with a touch pad to effect an interactive touch screen.

Outside of the art of programmable thermostat systems and programmable thermostats, dot matrix LCDs, which have pixel display elements arranged in rows and columns, are widely used. Dot matrix LCDs are not common as user-visible displays on programmable thermostats for viewing alphanumeric and iconic graphic information although such a thermostat is disclosed in, and particular features claimed in, co-pending U.S. patent application Ser. No. 10/440,474, filed May 15, 2003, and entitled: "Reverse Images in a Dot Matrix LCD for an Environmental Control Device" by Howard B. Rosen, incorporated by reference herein.

This limited use of dot matrix LCDs in programmable thermostats is because of basic engineering and practical considerations. Displayed information for a programmable thermostat generally includes such things as environmental conditions, heating and/or cooling equipment operation or non-operation, operational modes of the thermostat and the like. The most important information in thermostat displays is capable of being formed from segmented alphanumeric characters on less expensive LCDs without dot matrix capability and with reduced requirements for memory and programming.

Thus, dot matrix LCDs have not been widely used in prior art user programmable thermostats through a failure to understand an extended functionality capability of those devices when dot matrix LCDs are employed with a touch pad to effect an interactive display. This extended functionality is exploited to advantage in the present invention both to greatly simplify user programming and to relieve the manufacturer of the necessity to fabricate variants of the thermostat to suit the control and display aspects of various heating and/or cooling environments.

While the present invention may be practiced using segmented LCDs, it is preferably embodied using dot matrix LCDs.

OBJECTS OF THE INVENTION

It is therefore a broad object of this invention to provide a field programmable thermostat which may be user-configured to display ongoing costs of system operation.

It is a more specific object of this invention to provide a programmable thermostat having a touch screen in which the power consumption of each heating/cooling component and the energy costs in the locality are entered by a user in order that the thermostat's control program can, upon demand, calculate and display the heating/cooling costs accrued beginning with a user-specified starting date.

SUMMARY OF THE INVENTION

Briefly, these and other objects of the invention are provided by a programmable thermostat system for controlling space conditioning equipment and which includes: a transparent touch pad juxtaposed with an LCD (preferably dot matrix) to constitute a touch screen for interactive interface with a user; one or more environmental condition sensors for providing an electrical signal indicative of the one or more sensed environmental conditions of a conditioned space; and a processor including: a central processing unit, a real time clock, a memory coupled to the central processing unit for storing program and data information and an input/output unit coupled between the processor and the touch screen for carrying out information transfer therebetween.

A program stored in the memory directs the central processing unit to communicate through the input/output unit to selectively: establish on the LCD a representation of at least one virtual button at a predetermined XY position; read the same XY position on the touch pad to determine if the virtual button has been touched; and if the virtual button has been touched, perform a predetermined action such as moving to a different menu and/or changing operating criteria. An alphanumeric message explaining the function of the virtual button is also displayed, and icon indicators may be employed to unmistakably associate a message with a virtual button. Different menus can place the virtual buttons and messages in various positions on the touch screen to facilitate intuitive programming.

In accordance with the present invention, data about energy utility usage of environmental conditioning equipment connected for control by the thermostat is accumulated for selective display of cumulative energy usage and costs. Preliminarily, a user enters the power consumption rating for each component in the heating and/or cooling system and also the energy cost rates for the applicable utilities in the locality. During normal operation, the thermostat control program records the cumulative time each component operates. Upon an inquiry by the user, the cumulative time each system component has been in operation is used in a calculation with its energy requirement and cost factor to determine and display the current cumulative cost of operating each of the components and their summation of the period. For example, this "energy watch" function can be reset each month. Thus, the user can understand the cost factors in operating the system and make suitable decisions in temperature set points, etc., to minimize the cost of heating and/or cooling the conditioned space.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 8 is an exemplary pictorial of a second level interactive interface displayed on the touch screen with an exemplary sequence of virtual buttons available to a user upon touching a single virtual button;

FIG. 9 is an exemplary pictorial of the second level interactive interface displayed on the touch screen in FIG. 8 with a temporary "confirmation" virtual button for accepting the change of the single virtual button;

FIG. 10 is an exemplary pictorial of a second level interactive interface displayed on the touch screen in FIG. 8 with the function changed from "AUTOMATIC" to "COOL";

DETAILED DESCRIPTION OF THE PREFERRED EMBODIMENT(S)

Figure 1A:
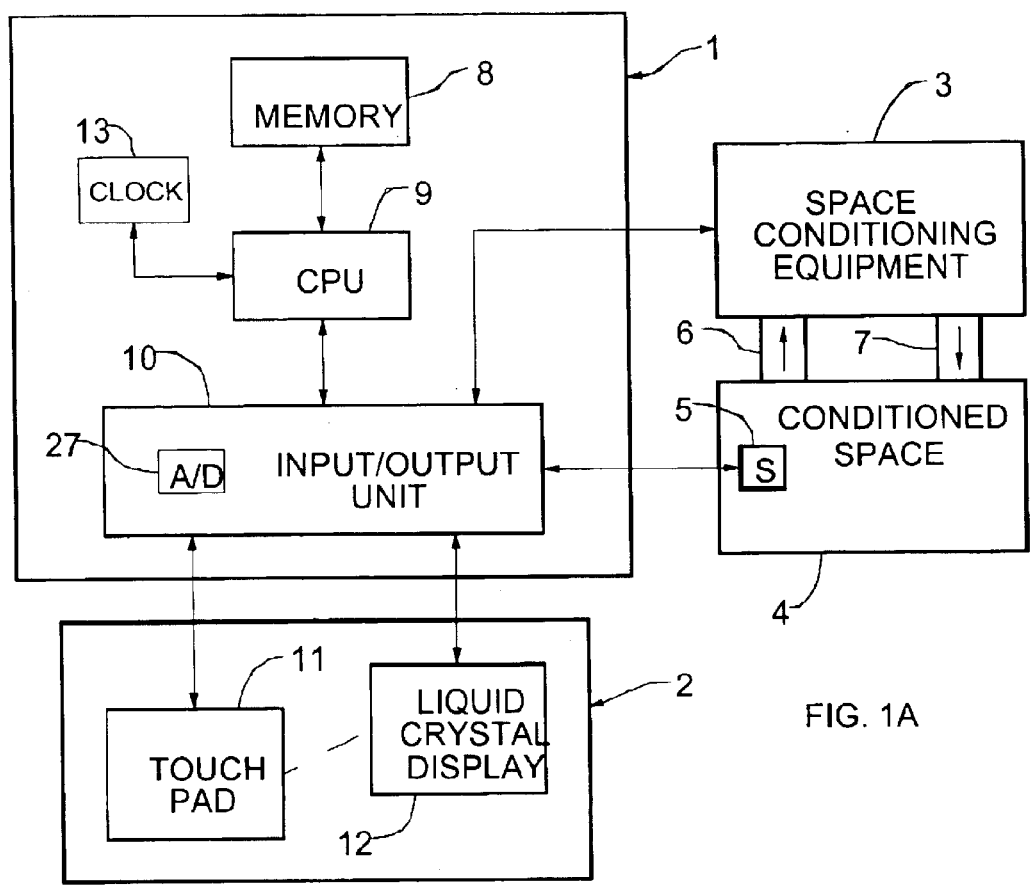
FIG. 1A is a block diagram of a space conditioning system incorporating a programmable thermostat according to the present invention.

Referring first to FIG. 1A, a user programmable thermostat system includes a processor 1, a touch screen 2 and a temperature sensor 5 which is disposed in a conditioned space 4. It will be understood that the processor 1 and the touch screen 2 are typically situated in a common housing (shown in an exemplary form in FIG. 5). The sensor 5 may also be situated in the common housing or remotely as shown, all as very well known in the art. The common housing is usually, but not necessarily, placed in the conditioned space 4. Thus, those skilled in the art will understand that the block diagram of FIG. 1A is very general in order to best explain the invention.

The processor 1 includes a central processing unit (CPU) 9 in communication with a memory 8 for storing data and program information and also, via an input/output unit (I/O unit) 10, a touch pad 11 and an LCD 12 which together constitute the touch screen 2. The memory 8 may include a read-only part which is factory-programmed to include the process control program and a random-access part which stores data subject to change during operation. A settable real time clock 13 is used to keep time in the thermostat system to facilitate diverse operations, such as establishing different temperature set points (desired temperatures), during different periods of the day cycle. An analog-to-digital converter 27 (which may not be required in all systems) serves to convert any analog information received by the I/O unit 10 to digital information which is suitable for use by the CPU 9. The thermostat system may be suitably powered by a battery (not shown) and/or from equipment to which is connected.

Temperature information from the sensor 5 and output signals to a space conditioning (heating and/or cooling) unit 3 pass through the I/O unit 10 under control of the CPU 9 executing the process control program stored in the memory 8. Those skilled in the art will understand that if the correspondents external to the processor 1 communicating with the CPU 9 are all digital in nature (e.g., if the temperature sensor 5 incorporates its own analog-to-digital converter and sends a digital representation of temperature to the processor 1), then the I/O unit 10 may only constitute simple switching circuits. The LCD may optionally be backlit by any suitable means (not shown in FIG. 1A).

The heating/cooling equipment unit 3 may include one or more components such as a heater, a compressor-type air conditioner, a heat pump, etc.

Thus, in the usual manner during normal operation, the temperature sensor 5 sends an electrical signal (e.g., if the sensor 5 is a simple thermistor, a resistance value; several types of temperature sensors are widely used) representative of the temperature within the conditioned space 4 which the processor can compare against a previously entered set point to determine if control signals need to be sent to the space conditioning equipment 3. For example, if the temperature in the conditioned space 4 is found to be too low when operation is in the heating mode, the processor 1 signals the space conditioning equipment 3 to circulate, through ducts 6, 7, air from/to the conditioned space 4 which is heated by the space conditioning equipment before return to the conditioned space. This heating phase continues until the sensor 5 indicates that the space is now too hot (or approaching too hot) with reference to the set point such that the processor 1 sends signal(s) to the space conditioning equipment 3 to cease the heating function, all as very well known in the art. In a cooling mode, a counterpart procedure is followed. Those skilled in the art will understand that the control process typically includes such refinements as anticipation, hysteresis accommodation, fan control, etc. which are acknowledged, but are not directly relevant to the invention.

It may be noted that integrated circuit chips including all the processor components with all the necessary interface conditioning circuits are available off-the-shelf and are under constant refinement for increased power. The subject invention only requires the capabilities of a processor such as the processor 1, and off-the-shelf integrated circuit processor chips may be used to advantage in the subject thermostat system.

Thermostat systems may be user programmable or non-user programmable. The present invention relates to programmable thermostat systems in which, in the prior art, programming steps have been entered using a "tactile" touch pad while observing a display which may be an LCD or some other display type. The drawbacks of the prior art interactive thermostats have been discussed above. The present invention employs a different type of thermostat user interface; viz., the touch screen 2, in which the touch pad 11 and LCD 12 are integrated and coordinated as will be discussed below and which, in conjunction with the processor 1, provides a programmable thermostat system which is very much easier to program than in the prior art.

Figure 1:
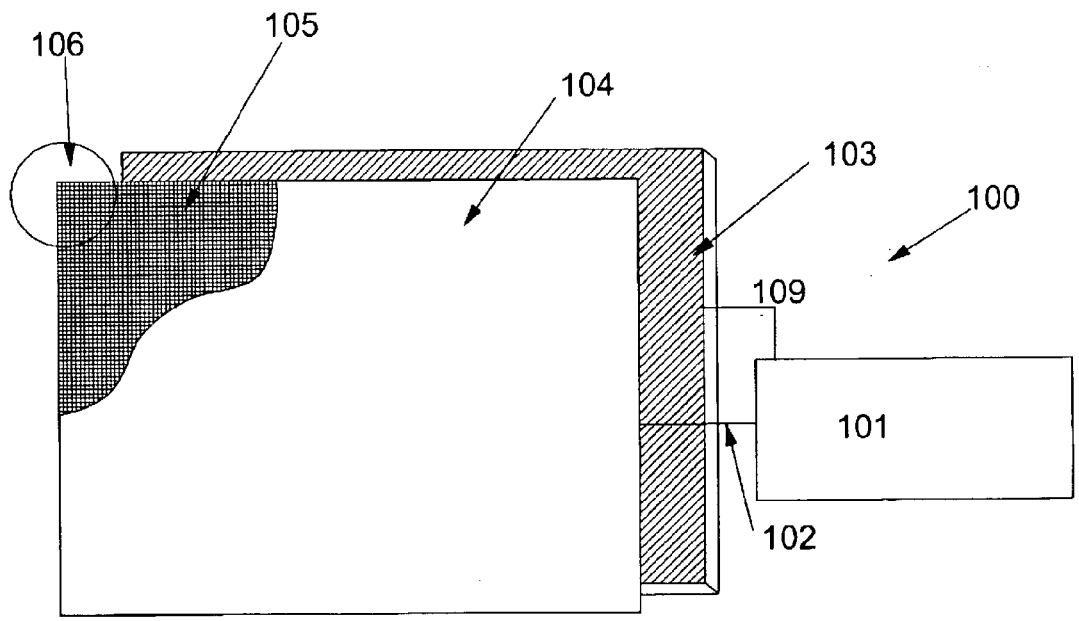
FIG. 1 is a partially cut away schematic and top view of a thermostat with a backlit dot matrix LCD employed as a display.

FIG. 1 shows a thermostat 100 having a processor 101 for controlling space conditioning equipment in a manner equivalent to the discussion above. The processor 101 is electrically coupled with multiple connections 102 to a dot matrix LCD 104 whose individual pixels 105 are driven by suitable signals to their respective vertical columns and horizontal rows from the processor 101. Backlight panel 103 is shown for illustration as separated from a backside of LCD 104 although it is known and preferred that these two components be in close contact. Backlight panel 103 is connected to a source of power and to processor 101 so that it can be turned on or off as needed or desired.

The processor 101 also optionally includes a light sensor (not shown) for sensing the illumination level in the space in which the LCD 104 is located, which illumination may be compared with a previously entered minimum illumination value to determine whether or not the room is darkened or dimly lit. If so, the display image can be reversed to improve readability. Alternatively, as the processor 101 includes a real time clock, an image reversal can be instituted at predetermined times of the 24-hour day.

Figure 2:
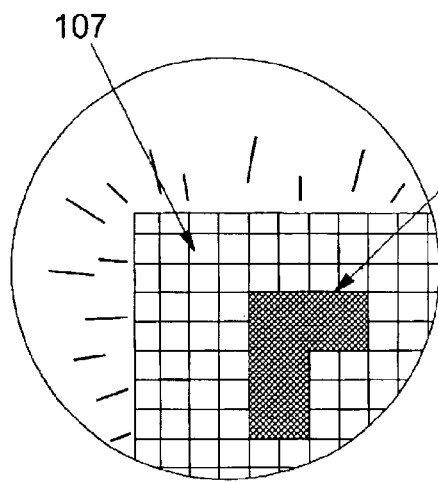
FIGS. 2 and 3 particularly illustrate a magnified section of the thermostat showing two forms of displaying contrast in a dot matrix LCD.

Thus, FIG. 2 shows section 106 operated as it would typically appear during a daytime or lighted room condition. The display elements of surrounding section 107 are essentially clear and, optionally, backlight panel 103 shines through them to improve readability. The display elements of image section 108 are partially or completely opaque during daytime or in a lighted space. The combination of image section 108 and surrounding section 107 therefore displays system information readily comprehensible and legible to a user in a lighted room.

Figure 3:
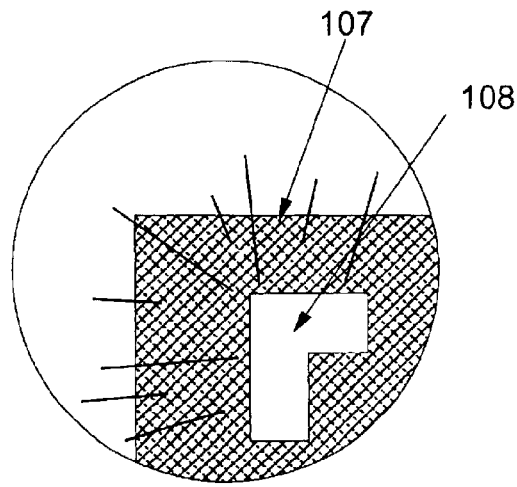

FIG. 3 shows section 106 operated as it would during nighttime or in a dimly lit room. The image has been reversed such that the display elements of the surrounding section 107 are now partially or completely opaque, and light provided by backlight panel 103 is partially or substantially completely blocked. But, the display elements of image section 108 are now essentially clear, and the light from backlight panel 103 shines through them. The current system information is thereby comprehensible and legible to a viewer in the darkened space. The result of this mode of operation is a dimmer display which is suitable for low lighting conditions.

In another, similar, mode of operation, the reversible image can be repeatedly reversed to "flash" all or selected items of the display upon the occurrence of certain conditions as will be described below.

Figure 4:
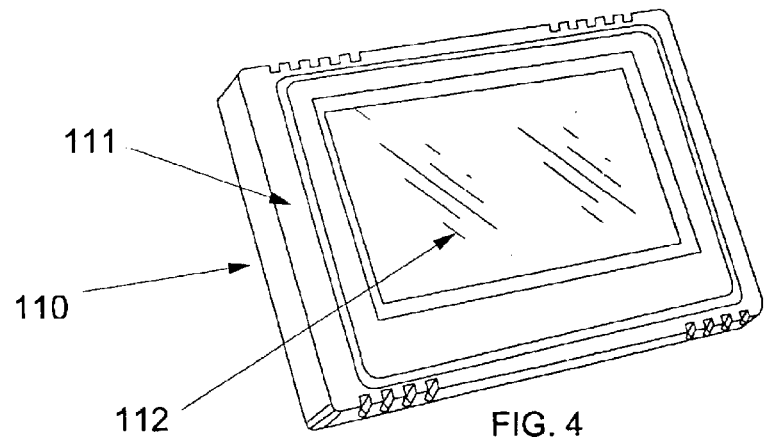
FIGS. 4 and 5 are perspective and front views, respectively, of an exemplary touch screen programmable thermostat of the present invention.
Figure 5:
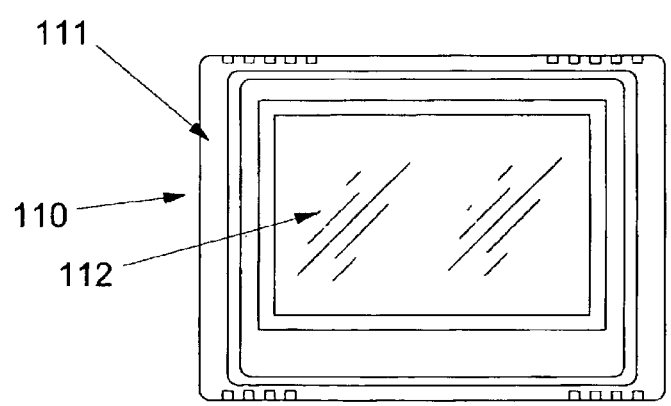

FIGS. 4 and 5 show an exemplary touch screen thermostat 110 with a housing 111 and touch screen 112 and incorporating the subject invention. Thermostat 110 has no physical buttons at all; rather, all the functions and displayed information of the programmable thermostat are available to a user by observation and interaction with the touch screen 112. In the example, the touch screen 112 is generally rectangular, thus having a long dimension and a short dimension.

Figure 6:
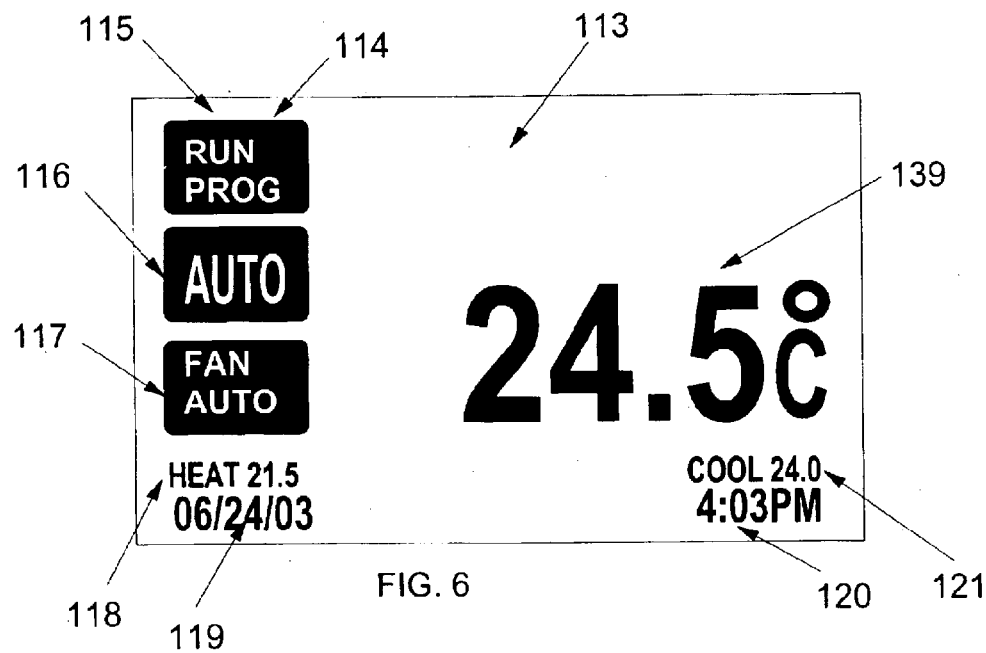
FIG. 6 is an exemplary pictorial of a first level interactive interface displayed on the touch screen.

FIG. 6 shows a first pictorial 113 presented on the touch screen 112 and including: a column 114 of interactive virtual buttons 115, 116, 117; a "current temperature" display 139; a "date" display 119; a "current time" display 120; a "heating mode active" display 118; and a "cooling mode active" display 121. Pictorial 113 displays the word "AUTO" on virtual button 116 because the thermostat 110 is currently operating in an "automatic" mode to control both a heater and an air conditioner to respective set points shown in displays 118 and 121.

Pictorial 113 is a first level touch screen; i.e., a default first screen that is normally viewed by a user when first approaching the thermostat 110. The information conveyed to a user, during normal system operation of the exemplary current configuration shown in FIG. 6, are: current ambient temperature, current date and time, that a heater will turn on with reference to a set point of 21.5° C., that the air conditioning system will turn with reference to a set point of 24.0° C., that the thermostat 110 is operating in the "AUTO" mode where both heating and air conditioning system components are active and that the fan is responding to only the heating and air conditioning modes (i,.e., not always running).

Figure 7:
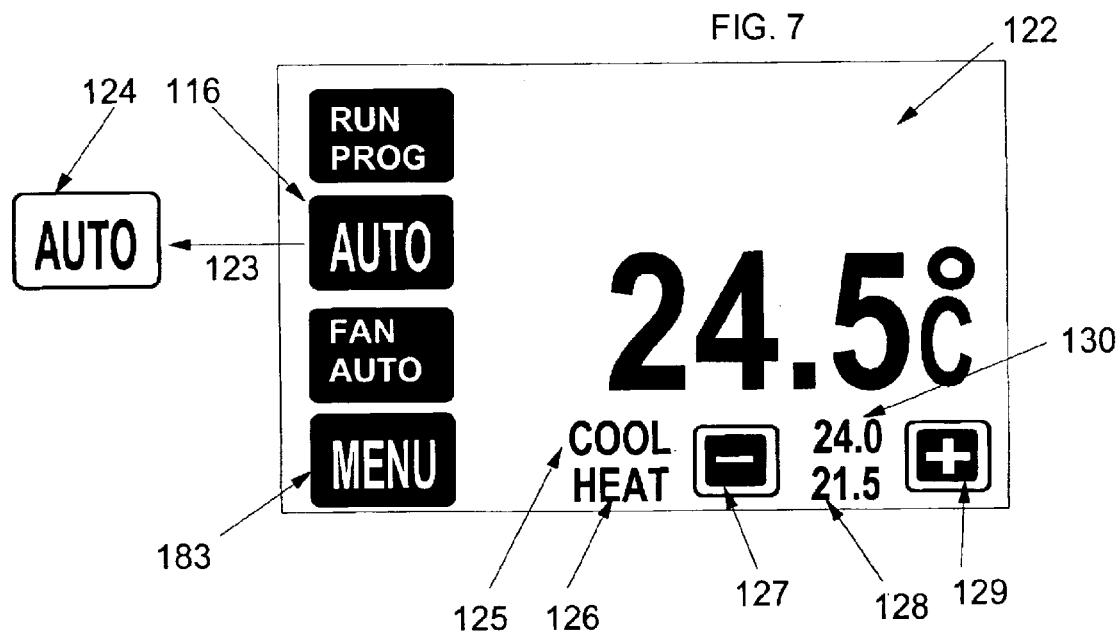
FIG. 7 is an exemplary pictorial of a second level interactive interface displayed on the touch screen showing exemplary alternate contrast for a touch screen virtual button.

When a user touches any active part of the touch screen in pictorial 113, the overall display changes to pictorial 122, a second level touch screen shown in FIG. 7. Virtual buttons 115, 116, and 117 still perform the functions described above. Newly-presented virtual buttons 127 and 129 can be selectively touched at temperature displays 128, and 130, respectively, to adjust the minimum and maximum set points. FIG. 7 also illustrates that virtual button 116 may be touched and responsively changed in step 123 by the control program to reverse contrast to be shown (in the same position previously occupied by virtual button 116) as reversed contrast virtual button 124. In order to attract the user's attention to this button position, reversals can be made in short intervals so that the virtual button 116 appears to be flashing. This "flashing" emphasizes the fact that the thermostat 110 is currently operating in a particular state or condition and that a user may want to change the operating state or condition of the thermostat 110. Touching virtual button 183 directs the control system to another mode of operation which will be discussed further below.

FIGS. 8 to 10 show pictorial 122 in various interactive conditions. FIG. 8 illustrates that virtual button 116 can undergo step 131 in response to a user touch which also causes a change in the operating state of thermostat 110 and a change of the legend associated with virtual button 116 to one of the virtual buttons in column 132. In the example, successive steps 133 to 137 indicate that a user has touched virtual button 116 one or more times to cause the operating state of thermostat 110 and the legend of virtual button 116 to change with respect to those steps as follows:

A) at step 137, from "automatic" mode to "off" mode (none of the environmental control equipment connected with thermostat 110 will operate, and virtual button 116 shows "OFF");

B) at step 133, from "off" mode to "heat" mode (a heater or a heat pump in heat mode operates to heat the conditioned space, and virtual button 116 shows "HEAT");

C) at step 134, from "heat" mode to "cool" mode (an air conditioner or heat pump operating in the cooling mode operates to cool the conditioned space, and virtual button 116 shows "COOL");

D) at step 135, from "cool" mode to "emergency heat" mode (a backup electric heater operates to keep the conditioned space temperature above a lowest set point, and virtual button 116 shows "EMER HEAT"); and E) at step 136, from "emergency heat" mode to "automatic" mode (the air conditioner and heater (or heat pump) operates in both the "heat" and "cool" mode, and virtual button 116 shows "AUTO").

FIGS. 9 and 10 illustrate an exemplary operation of changing, confirming and showing the change made by touching virtual button 116 twice. FIG. 9 shows that, under control of the process control program, virtual button 116 has already responded to step 133 to briefly change from the "auto" mode to the "heat" mode on the first touch and, on the second touch, has changed from the "heat" mode to the "cool" mode; and that a temporary active virtual button 138 is now displayed for a user to confirm that the user wishes to select the currently displayed function; i.e., "cool". Touching virtual button 138 under these conditions causes the changes seen in FIG. 10. It will be particularly noted in FIG. 10 that, as a feature of the system, display 118 has disappeared since the "auto" mode is no longer operational because no heating function is active. Display 121 is still present in FIG. 10 because the "cool" mode is operational. Should the "heat" mode be selected and "HEAT" shown with virtual button 116, display 121 will disappear and display 118 will reappear. In the "off" mode, both displays 118 and 121 will disappear.

It will be appreciated that the virtual buttons of virtual buttons column 132 may alternatively be reduced in size and distributed on the surface of pictorial 113 instead of being a set of virtual buttons activated and serially viewable by invoking steps 133–137. If the virtual buttons of virtual buttons column 132 are distributed as separately and simultaneously viewable virtual buttons, it is desirable that the virtual button for the function currently activated for thermostat 110 will "flash" in contrast as described above so that the user will know which of the operating states or conditions are currently controlled by thermostat 110.

However, it is an important feature of the thermostat 110 that, although a user may touch virtual button 116, fewer or more than all the virtual buttons of column 132, in the example, and their associated changes in the normal operation control effected by thermostat 110 may be available to a user. The user has the ability to "edit" and/or simplify the virtual buttons column 132 to reflect the user's environmental control equipment actually connected for control by thermostat 110.

If fewer than or more than the virtual buttons of virtual buttons column 132 are available to the user, appropriate fewer or more touching steps will be required to cycle through the functions of thermostat 110 and the corresponding legends which may appear with virtual button 116. The particular sequence of thermostat functions available at steps 133 to 137 is only exemplary of how normal user changes between operating states or conditions are made for thermostat 110; the virtual buttons of column 132 may, of course, have a different sequence and also reflect various space conditioning equipment components which may be installed in diverse applications.

Thus, as more fully described below, a user is able, typically during a system setup, to eliminate or add to the virtual buttons shown in column 132 (and their associated functions) by using the touch screen in a manner that allows the user to specify what environmental control equipment components are actually controlled by thermostat 110 and, accordingly, included in column 132.

In practice, the thermostat manufacturer provides, in the control program, control sequences for as many different types of space conditioning components as might be used in widely diverse applications, alone or in combination. During setup, the user of a given installation eliminates those components, and graphics displays related thereto, which are irrelevant to the given installation, thus simplifying later ongoing programming and use of the thermostat. This system setup procedure is instituted by touching the "MENU" button 183 shown in FIG. 7 which the control program responds to by displaying second-level pictorial 140 on the touch screen.

Figure 11:
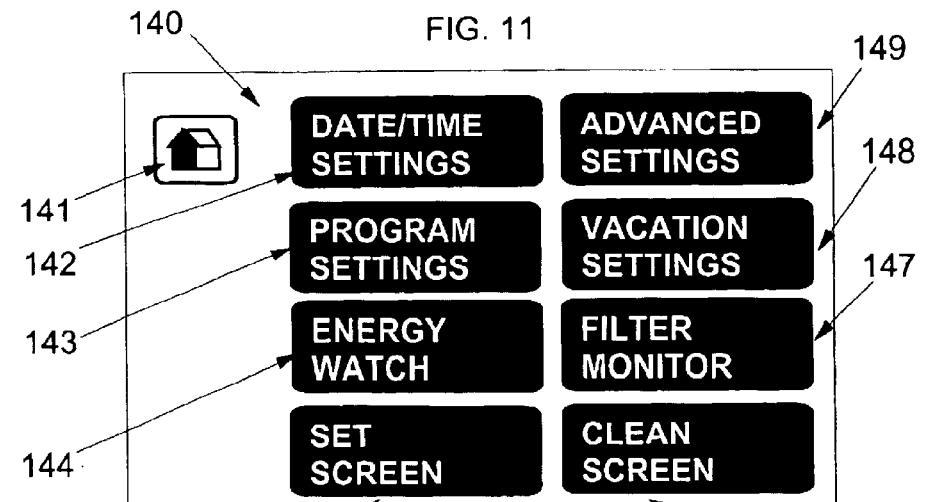
FIG. 11 is an exemplary pictorial of a menu displayed on the touch screen to provide a first set of menu selections including an "ADVANCED SETTINGS" virtual button.

FIG. 11 shows that pictorial 140 displays virtual buttons 141 to 149. Touching each of buttons 141 to 149 results in a new, usually third level, pictorial screen to show information and/or new buttons as follows:

A) for "home" icon button 141, a return to the first level, normal operation, pictorial 113 shown in FIG. 6;

B) for "DATE/TIME SETTINGS" button 142, for entering current date and time information;

C) for "SET SCREEN" button 145, for changing screen settings for the touch screen;

D) for "CLEAN SCREEN" button 146 to wipe the screen, e.g., with a lightly dampened cloth, without accidentally changing any of the settings; this function times out after a few seconds;

E) for button "FILTER MONITOR" button 147, entering, for display at pictorial 113 or similar touch screen, a reminder to change or clean filters on a specified schedule;

F) for "VACATION SETTINGS" button 148, for entering appropriate vacation system settings;

G) for "PROGRAM SETTINGS" button 143, for entering automatic temperature set point adjustments, typically for each of four selectable times for each day of the week;

H) for "ENERGY WATCH" button 144, for display of ongoing energy consumption and costs as discussed further below; and I) for "ADVANCED SETTINGS" button 149, for entering the environmental control equipment connected with thermostat 110, entering energy consumption data and costs and other functions as described.

Figure 12:
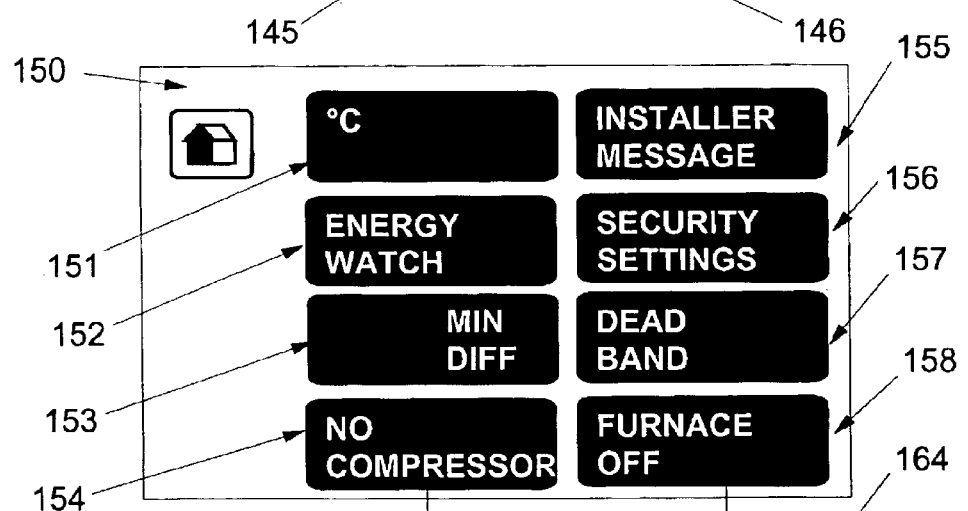
FIG. 12 is an exemplary pictorial of another interactive interface displayed on the touch screen showing "ADVANCED SETTINGS" menu selections after the "ADVANCED SETTINGS" virtual button of FIG. 11 has been touched.
Figure 12:
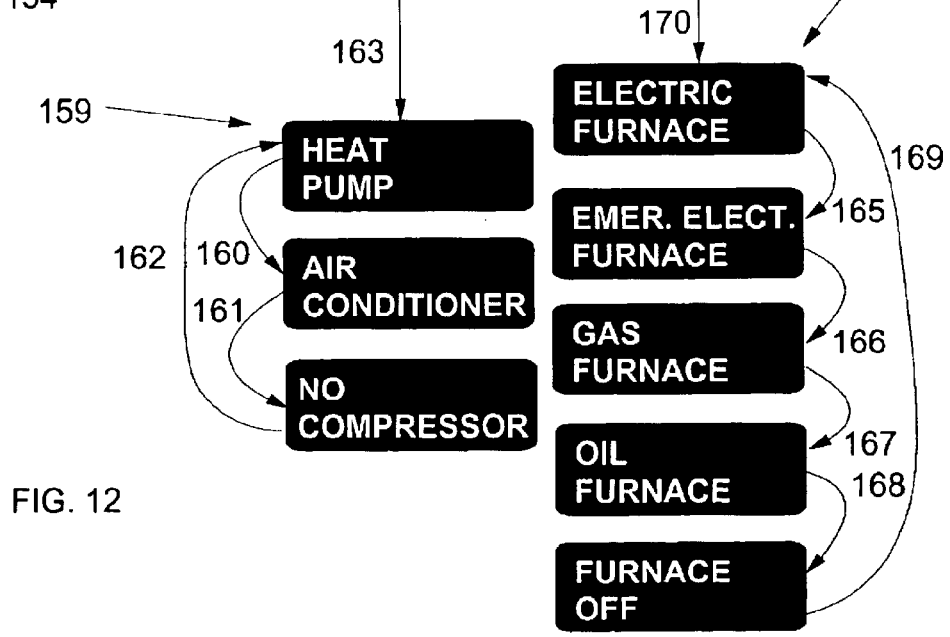

Touching virtual button 149 results in display of pictorial 150 of FIG. 12. In a manner similar to button 116 of FIG. 8, buttons 154 and 158 of FIG. 12 each represents a sequence of buttons that change after being touched by a user. Button 154 represents the presence or absence of air conditioning equipment connected with thermostat 110. Button 158 represents the presence or absence of heating equipment connected with thermostat 110.

More particularly, the virtual buttons in column 163 are those that become successively visible when a user successively touches button 154, also indicating a change in the designation of which cooling equipment is present in a given system. Similarly, in the example, buttons in column 164 are those that become successively visible when a user successively touches button 158, also indicating a change in the designation of which heating equipment is present in the given system.

In the example, invoking steps 160, 161 and 162 respectively cause a change in the function and legend appearing at button 154 from "heat pump" mode to "air conditioner" mode, from "air conditioner" mode to "no compressor" mode (no air conditioning equipment), and from "no compressor" mode to "heat pump" mode. The memory program contains programming adapted to cause effective operation of a heat pump or compressor type air conditioner depending on the one selected at button 154. If the "no compressor" mode is selected at button 154, the buttons column 132 of FIG. 8 will lack the "cool" and "auto" buttons and functions.

Cycling through steps 165, 166, 167, 168 and 169 respectively cause a change in the function and legend at button 158 from "electric furnace" mode (presence in the given system of an electric powered furnace) to "emer. elect. furnace" mode (additional presence of an emergency electric furnace), from "emer. elect. furnace" mode to "gas furnace" mode (presence of a gas furnace), from "gas furnace" mode to "oil furnace" mode (presence of an oil furnace), from "oil furnace" mode to "furnace off" mode (lack of heating equipment) and from "furnace off" mode to "electric furnace" mode. If the "furnace off" mode is selected at button 158, the buttons column 132 of FIG. 8 will lack the "heat" and "emer heat" mode buttons and functions as well as the "auto" mode button and function. The control program stored in memory contains routines adapted to cause effective operation of any combination of the designated equipment.

Pictorial 155 of FIG. 12 also shows virtual button 151 for changing the temperature designation in the touch screen from Centigrade to Fahrenheit, buttons 153 and 157 for entering certain set point related parameters, button 155 for entering an installer message and button 146 for entering security settings.

Figure 13:
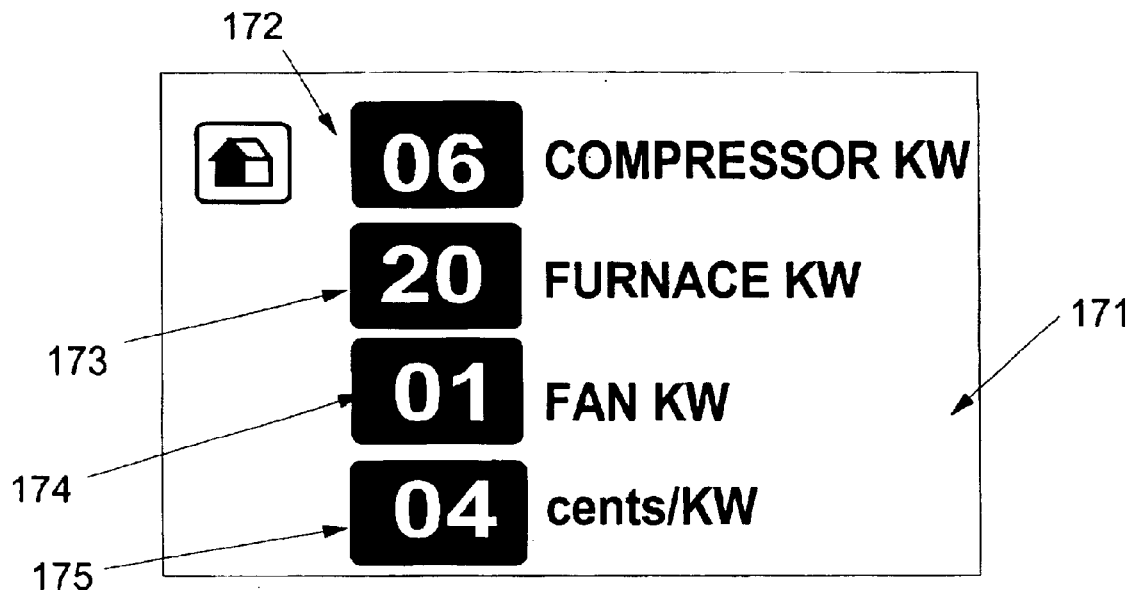
FIG. 13 is an exemplary pictorial of yet another interactive interface, reached by touching an "ENEGY WATCH" virtual button displayed on the touch screen, for entering settings for an "energy watch" mode.
Figure 14:
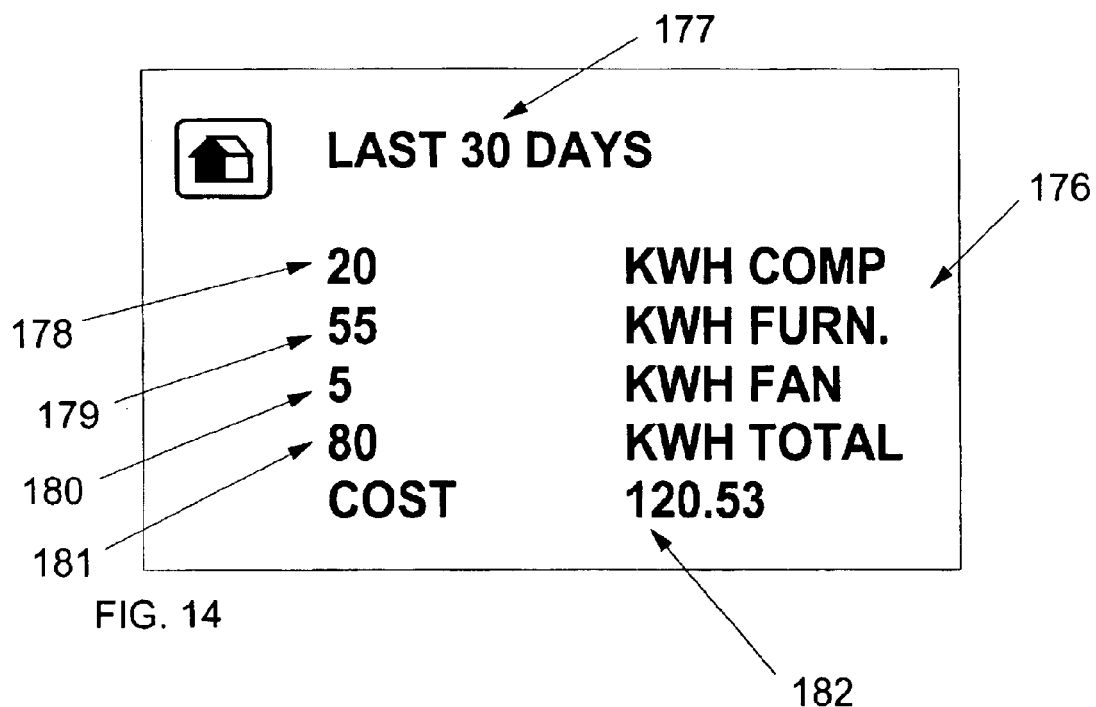
FIG. 14 is an exemplary pictorial of a third menu interactive interface displayed on the touch screen for the "energy watch" mode.

FIG. 13 shows pictorial 171 which is activated by a user's touching button 152 of FIG. 12. Pictorial 171 is a menu permitting entry of energy requirement and cost information using cost determination information entry virtual buttons 172, 173, 174 and 175. Touching button 172 changes the numerical legend in increments to indicate kilowatts per hour required of a compressor if air conditioning equipment is present. Thus, the user is able to enter into the energy required for operation of a cooling component in the system. In a similar manner for buttons 173 and 174, a user can enter the energy requirements for a heating furnace or heat pump if in the system and that of a system fan. Button 175 allows the user to enter the per kilowatt hour cost of energy in the user's locality. The equipment energy requirements and energy cost are stored in the memory and used by the control program to calculate and display cumulative energy used and cumulative cost of that energy for a monitored period. The memory stores in a cumulative amount the periods in which the air conditioner, furnace, heat pump, fan and/or other environmental control equipment operates, and calculates and displays, as shown in pictorial 176 of FIG. 14 the running energy cost information. In the example, display 177 shows the number of days for which the energy information has been accumulated. Displays 178, 179, 179, and 180 show energy used by respectively and cumulatively the air conditioning compressor, the furnace and the fan, with the total energy being used by that equipment in display 181 and the total cost of that energy shown in display 182.

It will be understood that the user, with a few button manipulations, can easily determine what the running cost is for the use of the environmental control equipment in the user's system. In the example, the user can successively touch: an active part of the touch screen of pictorial 113 of FIG. 6, the "MENU" button 183 of pictorial 122 of FIG. 8 and the "ENERGY WATCH" button 144 of pictorial 140 of FIG. 11 to arrive at the display of FIG. 14. Alternatively, the "ENERGY WATCH" button 144 can instead or also be provided on the touch screen of pictorial 113 of FIG. 6 so that a single button touch at the first level interface will bring the touch screen directly to the display of FIG. 14.

Figure 15:
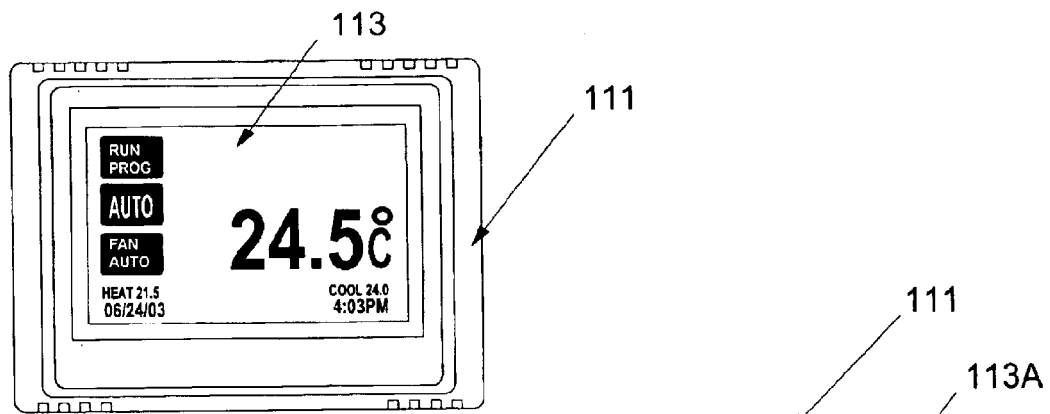
FIG. 15 is exemplary pictorial of an interactive interface displayed on the touch screen of FIG. 8 as viewed in the device of FIG. 5 disposed in a horizontal mounting position.
Figure 16:
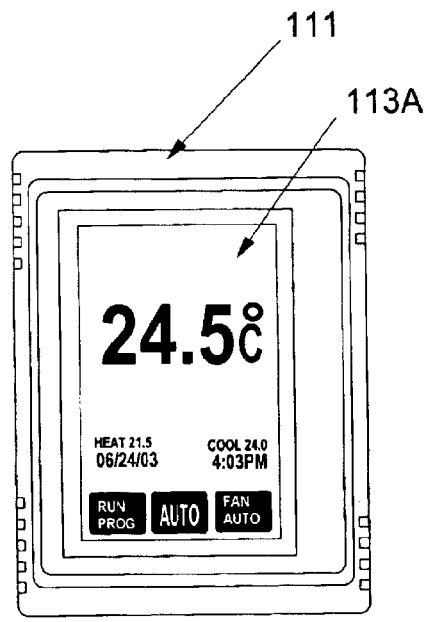
FIG. 16 is exemplary pictorial of the text and graphics of the interactive interface displayed on the touch screen of FIG. 8 rotated for the device of FIG. 5 disposed in a vertical mounting position.
Figure 17:
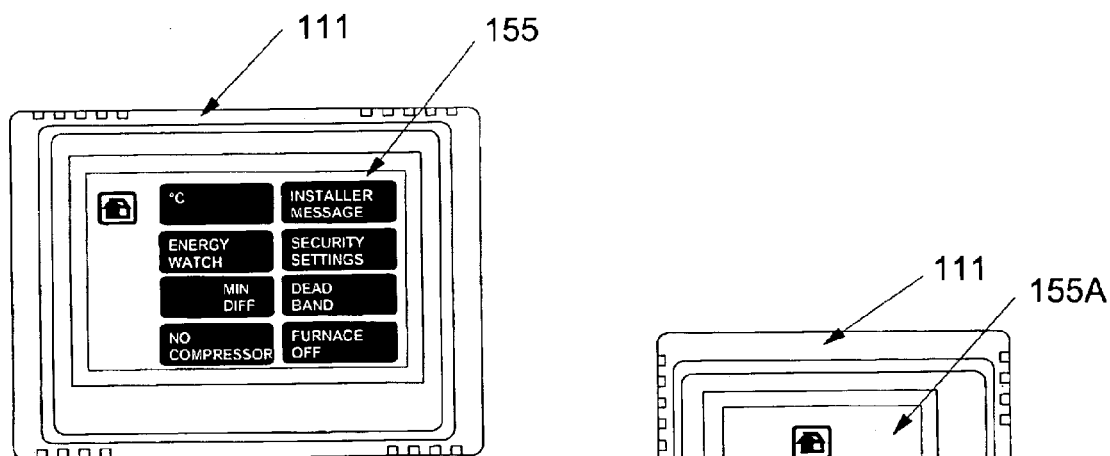
FIG. 17 is exemplary pictorial of an interactive interface displayed on the touch screen of FIG. 12 as viewed in the device of FIG. 5 disposed in a horizontal mounting position.
Figure 18:
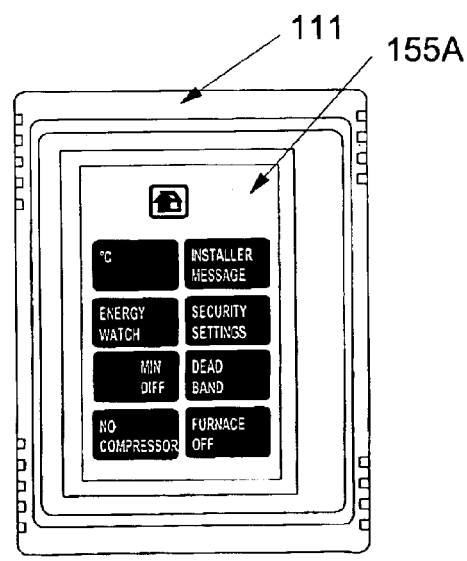
FIG. 18 is exemplary pictorial of the text and graphics of the interactive interface displayed on the touch screen of FIG. 12 rotated for the device of FIG. 5 disposed in a vertical position.

Attention is now directed to FIG. 15 which shows that pictorial 113 has alphanumeric text on the buttons and displays disposed horizontally for easy reading, as does the same alphanumeric text on the same buttons and displays in pictorial 113A of FIG. 16. However, the housing 111 of FIG. 15 has been rotated 90 degrees to obtain the vertical orientation of the housing 111 of FIG. 16. The control program of thermostat 110 can reorient the display from that shown in pictorial 113 to that shown in pictorial 113A by suitably remapping the column and row drive signals to the individual pixels of the LCD. This feature can be invoked, in one embodiment, by touching the "SCREEN SET" button 145 of pictorial 140 shown in FIG. 11 for a predetermined period of time (say five seconds), which action is sensed by the control program to cause a change of pictorial 113 to pictorial 113A or vice versa. All the pictorials for the touch screen for the thermostat 110 would be similarly reoriented, and FIGS. 17 and 18 show a similar translation of pictorial 155 to pictorial 155A.

This feature is not limited to a translation of only 90 degrees of the alphanumeric text, graphics and buttons of thermostat 110 as described above. The memory program, combined with the capability of a dot matrix type LCD, with its individually addressable pixels disposed in rows and columns, can cause a rotation of all those aspects of the touch screen to be rotated incrementally through 360 degrees so that a user can mount the housing 111 in whatever angled orientation is desired.

Figures 19, 20:
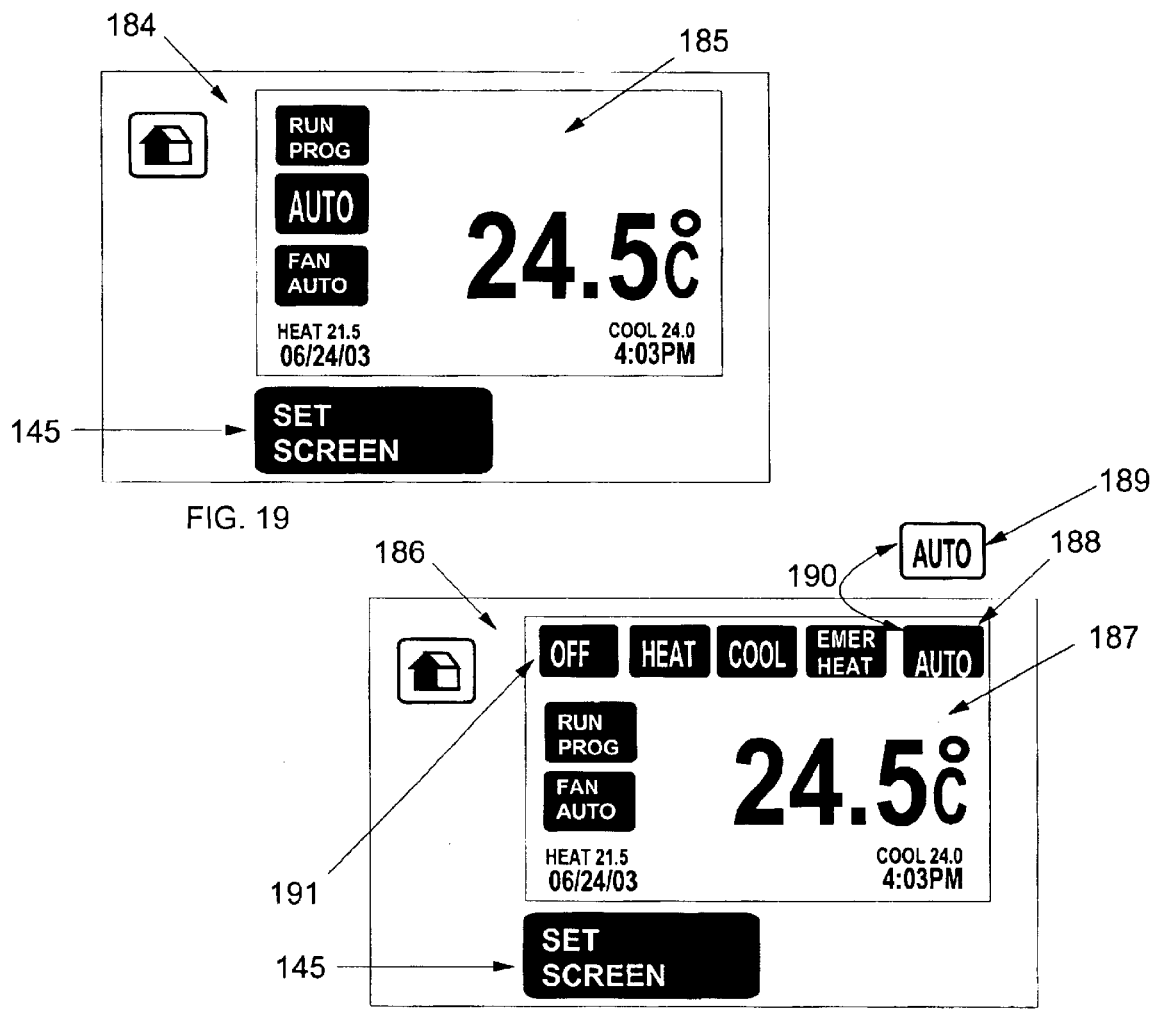
FIGS. 19 and 20 illustrate the manner in which different first level interface screens may be reviewed and selected.

Attention is now directed to FIG. 19 in which pictorial 184 is obtained by touching the "SET SCREEN" button 145 of pictorial 140 shown in FIG. 11 for a predetermined period of time (say five seconds). This touching action is sensed by the control program which causes a display change from pictorial 140 shown in FIG. 11 to the pictorial 184 shown in FIG. 19. Pictorial 184 contains a sub-pictorial 185 that is a framed and generalized inactive version of first level interactive pictorial 113 shown in FIG. 6. The user sees in sub-pictorial 185 a general layout of virtual buttons, text and graphics that can be selected to view as the pictorial of the first level interactive interface. This user selection can be made if the "SET SCREEN" button 145 of pictorial 184 shown in FIG. 19 is not touched for a predetermined period of time (say five seconds). However, the user can select other general layouts of virtual buttons, text and graphics that will thereafter be seen at the first level interactive interface.

Thus, referring now to FIG. 20. pictorial 186 contains a sub-pictorial 187 that is an alternate general layout of virtual buttons, text and graphics for the first level interactive interface that can be selected by a user. Sub-pictorial 187 appears if virtual button 145 is touched for a predetermined period of time (say five seconds). In sub-pictorial 187, a row of virtual buttons 191 are aligned along a top part of sub-pictorial 187 which will become the first level interactive interface shown in FIG. 8 when normal operation is resumed. When a return is made to the alternative first level interactive interface, touching any one of the virtual buttons 191 causes the control program of the thermostat to change operating states to one associated with that one virtual button. In one embodiment, a touched virtual button 191 is visually distinguished from the other virtual buttons 191 so the user knows which operating state currently controls the thermostat. One form of effecting that visual distinction is shown for virtual button 188. Virtual button 188 after being touched causes the control program to change the operating state of the thermostat to an "automatic" mode (the air conditioner and heater together, or a heat pump, operates in both the "heat" and "cool" modes, and virtual button 188 shows "AUTO"). Thereafter, the visible representation of virtual button 188 changes according to step 190 to the contrasting virtual button 189 and back to the form shown for virtual button 188 at short intervals to simulate a "flashing" virtual button. Virtual buttons 191 represent the same operating states represented by the similarly named virtual buttons of virtual buttons in column 132 shown in FIG. 8.

FIGS. 19 and 20 represent only two of many possible arrangements of virtual buttons, text and graphics that can be made available for selection by a user for the first level interactive interface. In the above exemplary method of making that selection, the user touches or refrains from touching the "SET SCREEN" button 145. This feature extends the ability of the user to select from one of several arrangements of virtual buttons, text and graphics at any of the levels of interactive or passive (information or graphics only) interface of the thermostat. This feature may be implemented by steps other than touching or refraining from touching the "SET SCREEN" button 145.

While the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A programmable thermostat system for controlling space conditioning equipment comprising:
   A) at least one environmental condition sensor providing an electrical signal indicative of the ambient temperature of a conditioned space in which said environmental condition sensor is situated;
   B) a transparent touch pad juxtaposed with a liquid crystal display to constitute a touch screen for interactive interface with a user;
   C) a processor, said processor including:
      1) a central processing unit;
      2) a real time clock;
      3) a memory coupled to said central processing unit for storing program and data information; and
      4) an input/output unit coupled between said processor and said touch screen for carrying out information transfer therebetween, said input/output unit further including:
         a) a sensor input coupled to each said environmental condition sensors for receiving said electrical signal therefrom; and
         b) a control output coupled to the space conditioning equipment for issuing control signals thereto; and
   D) a control program stored in said memory for causing said central processing unit to communicate through said input/output unit to selectively:
      1) establish on said touch screen:
         a) a representation of a first virtual button; and
         b) a first legend indicative of said first virtual button, if touched, invoking a first setup function of said thermostat, which first setup function is for entering:
            i) power consumption ratings for each space conditioning equipment component; and
            ii) the cost rate for each type of energy used by the space conditioning equipment;
      2) read the touch screen to determine if the representation of said first virtual button has been touched;
      3) if the first virtual button has been touched, displaying a menu of cost determination information entry virtual buttons on said touch screen, each cost determination information entry virtual button representing a type of cost information;
      4) read the positions on the touch screen of said cost determination information entry virtual buttons; and
      5) for each cost determination information entry virtual button touched, store in said memory an incremental cost information amount of the type represented thereby.

2. The programmable thermostat system of claim 1 which further includes, in step D), the substeps:
 6) establish on said touch screen:
  a) a representation of a second virtual button; and
  b) a second legend indicative of said second virtual button, if touched, invoking a first interrogation function of said thermostat for displaying cumulative usage of each space conditioning system component;
 7) read the touch screen to determine if the representation of said first virtual button has been touched; and
 8) if the first virtual button has been touched, displaying cumulative system usage and usage cost on the touch screen.

3. The programmable thermostat system of claim 2 in which one type of cost entry information is the kilowatt hour schedule for the electricity supplier.

4. The programmable thermostat system of claim 3 in which individual cumulative usage for each system component is displayed in substep D)8).

5. The programmable thermostat system of claim 4 in which said liquid crystal display is a dot matrix type.

6. The programmable thermostat system of claim 3 in which said liquid crystal display is a dot matrix type.

7. The programmable thermostat system of claim 2 in which individual cumulative usage for each system component is displayed in substep D)8).

8. The programmable thermostat system of claim 7 in which said liquid crystal display is a dot matrix type.

9. The programmable thermostat system of claim 2 in which said liquid crystal display is a dot matrix type.

10. The programmable thermostat system of claim 1 in which one type of cost entry information is the kilowatt hour schedule for the electricity supplier.

11. The programmable thermostat system of claim 10 in which individual cumulative usage for each system component is displayed in substep D)8).

12. The programmable thermostat system of claim 11 in which said liquid crystal display is a dot matrix type.

13. The programmable thermostat system of claim 10 in which said liquid crystal display is a dot matrix type.

* * * * *

Disclaimer

6,786,421 B2—Howard Rosen, Hampstead, Quebec, H3X 3E3 (CA). PROGRAMMABLE THERMOSTAT INCLUDING A FEATURE FOR PROVIDING A RUNNING TOTAL FOR THE COST OF ENERGY CONSUMED DURING A GIVEN PERIOD FOR HEATING AND/OR COOLING A CONDITIONED SPACE. Patent dated Sept. 7, 2004. Disclaimer filed February 7, 2005 by Inventor.

Hereby enters this disclaimer to all claims for the entire term of said patent.

*(Official Gazette, September 20, 2005)*